(No Model.)

W. H. ROGERS.
FISHWAY.

No. 366,257. Patented July 12, 1887.

Witnesses:
Henry Wyckoff Rogers.
William Greenfield.

Inventor
William H. Rogers.
per
J. B. Kinney,
Attorney.

UNITED STATES PATENT OFFICE.

WILLIAM HENRY ROGERS, OF AMHERST, NOVA SCOTIA, CANADA.

FISHWAY.

SPECIFICATION forming part of Letters Patent No. 366,257, dated July 12, 1887.

Application filed November 3, 1886. Serial No. 217,922. (No model.)

*To all whom it may concern:*

Be it known that I, WILLIAM HENRY ROGERS, a citizen of Canada, residing at Amherst, in the county of Cumberland and Province of Nova Scotia, Canada, have invented certain new and useful improvements in placing fish-ladders in the beds of streams for the purpose of more effectually passing anadromous fishes up over dams and around natural cliffs or falls of water, of which the following is a specification.

The object I have in view is to prevent the necessity of opening or piercing a dam already built in any river or stream, for the purpose of placing fishways therein, thereby endangering the safety of the dam and causing great expense and trouble to mill-owners, water companies, and others interested or connected therewith; and, also, inasmuch as it is necessary to have the foot of a fishway flush with the face of a dam, where anadromous fishes, on their way up a river or stream, are arrested in their course and instinctively seek an inlet to get through the dam or cliff or any other impediment in their way, it is needful to place a fishway in some similar place or position, when the action of the fish, being arrested and trying to find a way through or up over, shall be the same as at the face of the main dam or natural water-fall in a river.

My invention therefore consists in building auxiliary dam either a part or all of the way across a river at a sufficient distance below the main dam or cliff in a river, of sufficient height to completely arrest the progress of fish swimming up river, and cause them to turn aside to seek for an opening through the obstacle, and of placing therein one or more fish-ladders of such pattern or description as may be chosen by the parties interested, and of carrying them up either into canals flowing down the side of the river, or around the ends of the main dam or natural cliff into the lake waters above the dam or obstruction, so that fish may be transferred easily from the river below to the pond above the dam.

Figure 1:
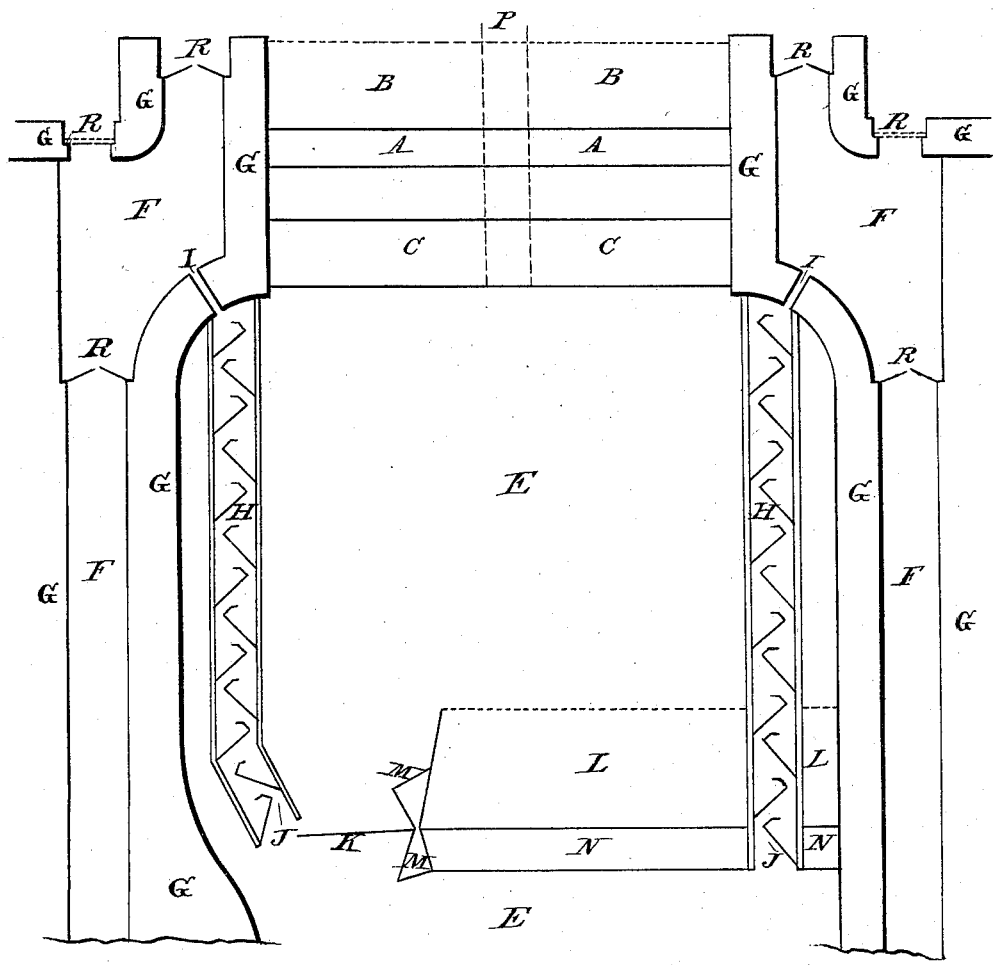
Figure 2:
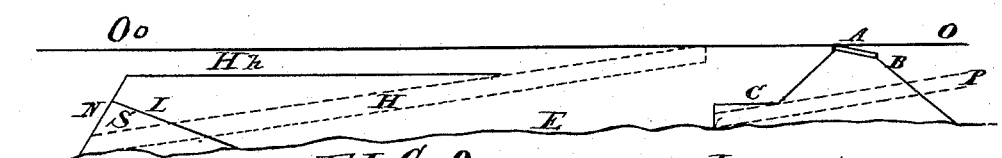

In the accompanying drawings, forming a part hereof, Figure 1 is a general plan of the arrangement, and Fig. 2 is a vertical sectional view of the same.

Like letters denote the same parts in both figures.

A A represent the top of the main dam, or a cliff of rocks which sometimes cross a river. B is the inner face of it. C is the lower face, over which the flood of water pours.

P is the position in which it would be proper to place a fish ladder or way to make it effectual in passing fish up through to the waters above, but not always practicable, for the reasons before stated.

F is a canal built to carry water from the pond above down to mills below, or for other purposes.

R R are gates by which the flow of water may be regulated.

L is the auxiliary dam built below the main dam or cliff when there is such obstruction to the passage of fish, and is that which I claim as new in this arrangement of placing fish-ladders. N is the lower face of this dam when fish are stayed in their progress upstream. K is a wire fence used in some cases for the same purpose when the water has not too much force to prevent its security. M M are wings of the same for turning fish in any direction as is required, and usually made use of.

H is the fish ladder or way, with an entrance into the canal. This ladder may be carried up around any dam or cliff, as desired.

G is the wall or bank which separates the water in the canal from the river and holds it at the level of the head waters.

E is the bed of the river, where fish come up.

J J shows the foot of the ladders, showing the open mouth at the face of the auxiliary dam, and I is the outlet from the ladder to the head waters above or inlet of water from the canal or pond above to the said ladder.

In Fig. 2, O represents the level of the water in the canal or the pond above the main obstruction in the river. Oo shows the level of top of main dam or any obstruction. A is the top of sectional drawing of main dam. B is the upper slope; C, the front face; D, the body of main dam. P shows where the ladder should be placed when practicable. E is the river-bottom. S is a section of auxiliary dam. L is the back slope, and N the front or down-stream face, the obstruction presented to fish for the purpose of preventing them from passing the foot of the ladder and turning them into it. H is the fishway in position, and H*h* is the sides of fishway built up to keep water from flowing in at the sides.

What I claim as my invention is—

An auxiliary dam placed in the stream at a suitable interval below the main dam or cliff, and having placed therein a fish ladder or way, with its foot flush with the face of said auxiliary dam, and thence extending into the canal above or around the head of the main dam or cliff and into the upper stream, substantially as described.

WILLIAM HENRY ROGERS.

Witnesses:
H. WYCKOFF ROGERS,
W. GREENFIELD.